United States Patent [19]
Mickelson

[11] Patent Number: 5,917,448
[45] Date of Patent: Jun. 29, 1999

[54] ATTITUDE DETERMINATION SYSTEM WITH SEQUENCING ANTENNA INPUTS

[75] Inventor: Wilmer A. Mickelson, Cedar Rapids, Iowa

[73] Assignee: Rockwell Science Center, Inc., Thousand Oaks, Calif.

[21] Appl. No.: 08/908,418

[22] Filed: Aug. 7, 1997

[51] Int. Cl.[6] .................................................. G01S 5/02
[52] U.S. Cl. ........................... 342/442; 342/140; 342/424
[58] Field of Search .................... 342/133, 139, 342/140, 146, 147, 434, 442, 424

[56] References Cited

U.S. PATENT DOCUMENTS

| | | | |
|---|---|---|---|
| 3,670,275 | 6/1972 | Kalliomaki et al. | 325/370 |
| 3,671,967 | 6/1972 | Fries | 343/108 R |
| 4,359,732 | 11/1982 | Martin | 343/5 CM |
| 4,647,935 | 3/1987 | Helbling | 342/433 |
| 4,719,469 | 1/1988 | Beier et al. | 342/434 |
| 5,175,557 | 12/1992 | King et al. | 342/357 |
| 5,248,981 | 9/1993 | Yoshihara et al. | 342/357 |
| 5,268,695 | 12/1993 | Dentinger et al. | 342/357 |
| 5,347,286 | 9/1994 | Babitch | 342/359 |
| 5,657,025 | 8/1997 | Ebner et al. | 342/357 |

OTHER PUBLICATIONS

Brown, Ron, and Phil Ward, A GPS Receiver with Built–In Precision Pointing Capability, IEEE 83 (1990).

Cohen, Clark E., and Bradford W. Parkinson, Expanding the Performance Envelope of GPS–Based Attitude Determination, ION GPS 1001, Albuquerque, NM (Sep. 9–13, 1991).

Cohen, Clark E., Glenn Lightsey, William A. Feess and Bradford W. Parkinson, Space Flight Tests of Attitude Determination Using GPS.

Kruczynski, Leonard R., Pui C. Li, Alan G. Evans and Bruce R. Hermann, Using GPS to Determine Vehicle Attitude: USS Yorktown Test Results.

Wu, Keng, Attitude Determination using Dedicated and Nondedicated Multiantenna GPS Sensors, 30, No. 4 IEEE Transactions on Aerospace and Electronic Systems 1053 (Oct., 1994).

Miller, B. Larry, Craig A. Phillips, Alan G. Evans and John E. Bibel, A Kalman Filter Implementation for a Dual–Antenna GPS Receiver and an Inertial Navigation System.

Quinn, Paul G., Instantaneous GPS Attitude Determination.

*Primary Examiner*—Thomas Tarcza
*Assistant Examiner*—Dao L. Phan
*Attorney, Agent, or Firm*—Kyle Eppele; James P. O'Shaughnessy

[57] ABSTRACT

An attitude determination system uses multiple antenna inputs which are time-multiplexed into a multi-channel receiver. Each channel tracks one incoming signal from a known or ascertainable source. For each of the incoming signals being tracked, digital processing can be used to determine range differences between the different antenna elements for that incoming signal, and to compute attitude based on the range differences and the known configuration of the antenna elements relative to each other.

20 Claims, 2 Drawing Sheets

ATTITUDE DETERMINATION SYSTEM WITH SEQUENCING ANTENNA INPUTS

BACKGROUND

The present invention relates to a system and method of attitude determination. More specifically, it relates to a system and method wherein the attitude of a platform may be determined based on the differences between the phase of a carrier signal received at different antenna elements on the platform.

The Global Positioning System (GPS) is an example of a current navigation system in which numerous signals are transmitted from points which are known or ascertainable by the receiver. By tracking signals from such a system, a receiver may be able to derive information such as its position, direction, or velocity.

It is also known how to calculate the attitude of a platform, from phase differences of such signals between different antenna elements on the platform, using known information about the physical arrangement of the antenna elements relative to each other. Some known systems use separate receiver channels to track each incoming signal simultaneously from different antennas. A first difference of the phase measurements from a single incoming signal obtained at a pair of antennas is formed to remove receiver clock biases and selective availability (SA) errors. SA refers to intentional degradation of some signals which are commercially available. A second difference of the phase measurements from a pair of signals is formed to remove common antenna transmission path delays. The phase difference measurements must be adjusted for the integer number of phase cycles between pairs of antennas, and this cycle ambiguity is normally determined by systematic search methods which minimize some measure of phase error. These designs are costly, introduce channel to channel biases, have stringent timing requirements, and may need to operate multiple receivers from a common clock.

In one embodiment of the present invention, the attitude of a platform is determined by time-multiplexing among antenna inputs, when the platform is stationary or the receiver is integrated with an inertial system for motion compensation. The resulting signal can be applied to each channel of a multi-channel receiver. Each channel is capable of tracking one of the incoming signals, and the phase differences for that one incoming signal are determined by digital processing, as the signal being applied to all of the channels is switched from one antenna input to another. The number of incoming signals being tracked, and consequently the number of signals for which phase differences between the antenna elements can be measured, can correspond with the number of channels—regardless of the number of antenna elements. The phase difference determinations are used to determine the attitude of the platform.

This approach minimizes the number of channels required, and alleviates channel bias, timing, and common clock problems. It is also a simpler technique because only a single difference of measurement data is required. In addition, the multiplexing may occur at a slow rate of one Hertz (Hz) or even less. The slow rate results in less noise than is possible with higher rate multiplexing, and in lower demands on the receiver's processing capabilities.

The features of the present invention which are believed to be novel are set forth below with particularity in the appended claims. The invention, together with further advantages thereof, may be understood by reference to the following description in conjunction with the accompanying drawings, which illustrate specific embodiments of the invention.

DETAILED DESCRIPTION OF THE INVENTION

Figure 1:
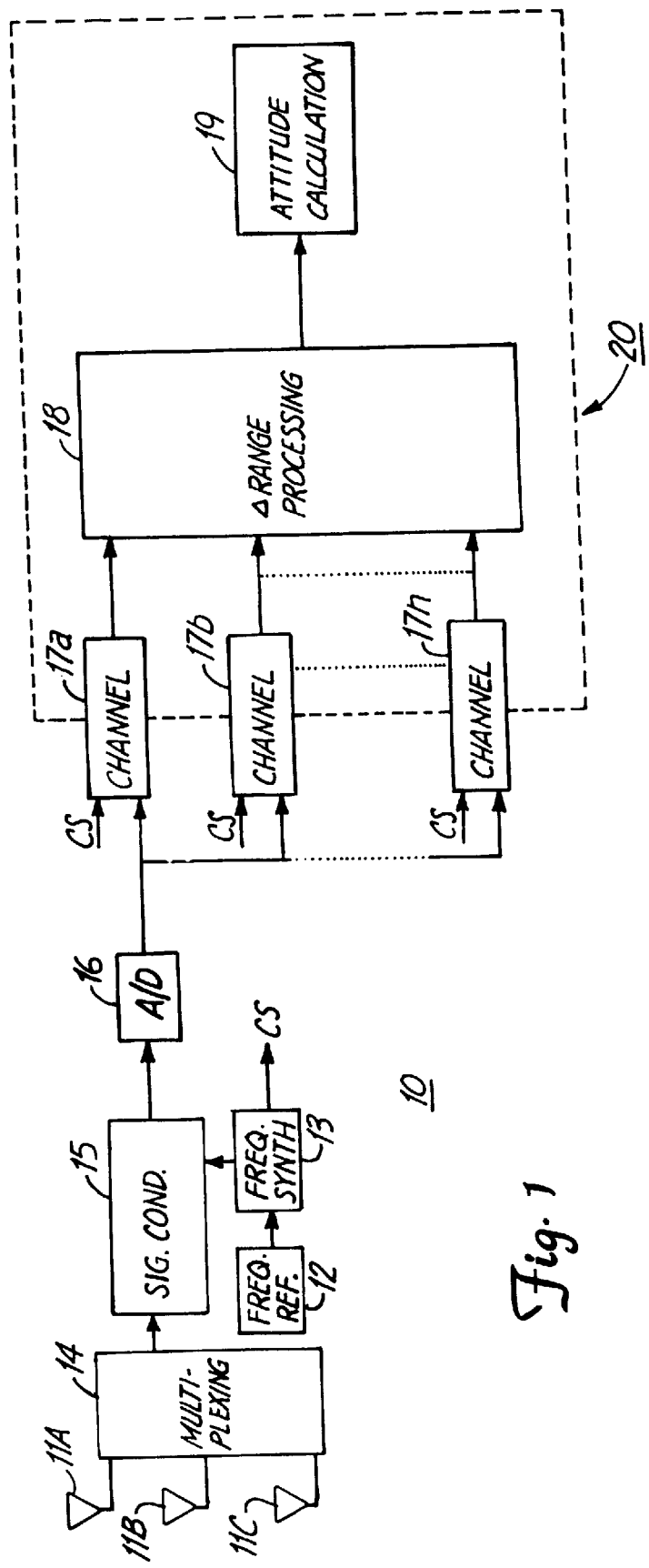
FIG. 1 is an example functional block diagram of an embodiment of the invention.

FIG. 1 is an example functional block diagram of one embodiment of an attitude determination system 10 in accordance with the invention. All of the incoming signals are received by each of antenna elements 11A, 11B, and 11C in the example of FIG. 1. Time-multiplexing 14 occurs by switching sequentially among the three antenna signals from each of antenna elements 11A, 11B, and 11C, respectively.

Three non-colinear antenna elements are required for a full-three axis attitude determination, but only two antenna elements are required for azimuth determination alone. In some applications, for example, inertial sensors on the platform may quickly determine roll and pitch levels so that only two antenna elements are necessary.

The multiplexing 14 may occur at a slow rate. For use in conjunction with some navigation systems commercially available at present, a rate between about 0.1 Hz and about 10 Hz can be desirable. Some such systems use signals with time constants between about 0.1 and about 0.2 seconds, and the delta range sampling interval discussed below should be long enough for carrier loop transients induced by switching antenna signals to stabilize. In one embodiment, a rate of less than about 1 Hz was used with good results.

An option in the example of FIG. 1 is to perform signal conditioning 15 on the time-multiplexed antenna signals. This may include filtering, amplification, and additional filtering to eliminate undesired noise effects. The signal conditioning 15 also may include signal level control and down conversion of carrier frequencies from transmission frequencies to intermediate frequencies. Frequency synthesizing 13 and a reference oscillator 12 are also shown in the example of FIG. 1.

In the example of FIG. 1, the signal conditioning 15 is performed after the multiplexing 14, so that any phase delay introduced by the signal conditioning 15 will not affect phase differences observed between the different antenna elements 11A, 11B, and 11C. In other words, signals from each of the antenna elements 11A, 11B, and 11C would share the same circuit path as much as possible to minimize circuit path bias.

The example of FIG. 1 may include analog to digital conversion 16. It is a design choice whether to use conversion 16 and where to place it in the circuit. However, in one embodiment it is desirable for the delta range processing 18 to use digital processing. Some embodiments may use all digital signals earlier in the circuit.

After conversion 16 in the example of FIG. 1, the resulting received signal (hereinafter the "received signal") is applied to each of the "n" receiver channels 17a through 17n. The received signal includes all of the incoming signals received by each of the antenna elements 11A, 11B, and 11C in FIG. 1 (optionally after signal conditioning). However, the received signal is coupled sequentially from one after another of the antenna elements 11A, 11B, and 11C, as multiplexing 14 occurs among the respective antenna signals.

In the example of FIG. 1, each of the incoming signals is transmitted from a source which is known or ascertainable by the receiver. Different incoming signals may be coming from different sources, and some sources may be transmitting more than one signal with different carrier frequencies. These carrier frequencies are known or ascertainable by the receiver.

Many systems for processing transmitted data, such as communication or navigation systems (including GPS), concern broad-band, spread-spectrum signals modulated by pseudo-random noise codes. A pseudo-random noise code refers to a systematically generated code which is derived from a sequence, but which often is long enough to appear to be random. When a relatively narrow-band signal is modulated by a pseudo-random noise code digital signal, the relatively narrow-band signal is spread across a very wide band of the frequency spectrum and appears as noise to receivers. However, the incoming signal may be demodulated by mixing it with an identical locally generated pseudo-random noise code, effectively despreading the signal and revealing the original relatively narrow-band signal.

While the pseudo-random noise code and its bit rate are known in advance, or at least the pseudo-random noise code is known to be one of a limited set of such codes, the receiver synchronizes the identical locally generated code so that it is in phase with the incoming pseudo-random noise code. In the mixing operation, the resulting imposition of the two identical pseudo-random noise code digital signals on the original relatively narrow-band signal yields that despread original signal if the two codes are synchronized. In effect, $$P^j(t)*P^j(t)=1,$$

where $P^j(t)$ is a particular pseudo-randum noise code and, as is typically done in such explanatory representations, the symbol * depicts an appropriate mixing operation.

In the example of FIG. 1, the received signal is applied to each of the channels 17a through 17n, and each channel tracks one incoming signal. In the embodiment of FIG. 1, the incoming signal being tracked in each channel comes sequentially from one after another of the antenna elements 11A, 11B, and 11C, as multiplexing 14 occurs among the respective antenna signals. For an embodiment with a spread-spectrum incoming signal, the channel can generate a pseudo-random noise code identical to the one modulating the signal being tracked in that channel, and can synchronize the two codes using a code and carrier loop as is known. If necessary, filtering can isolate the desired, despread signal. In some embodiments, there may be incoming signals which are not spread-spectrum signals.

In some embodiments, code and carrier loop functions for tracking the carrier may include phase rotation, phase detection, filtering, and generating a control command to a numerically controlled oscillator (NCO) that develops a reference angle for the carrier phase rotation. In the example of FIG. 1, frequency sythesizing 13 generates a clock signal CS which can be applied to the carrier NCO in each of channels 17a through 17n. At least part of the functions of each code and carrier loop may be accomplished by a micro-processor 20, as in the example of FIG. 1.

In some embodiments of FIG. 1, one signal available from the code and carrier loop in each channel (17a through 17n) tracking an incoming signal j is the control command to the carrier NCO. This control command is derived from a phase error signal for tracking the carrier for that incoming signal. Delta range processing 18 includes sequential determination of the delta range for each incoming signal being tracked. That delta range is the integration or accumulation of all of the control commands for incoming signal j over the sample time interval. In this way, the example of FIG. 1 uses an open loop design to measure the delta range acumulated over the sample time interval. As explained below, the attitude of the platform is derived using the delta range determinations for each of the signals being tracked.

In the example of FIG. 1, attitude calculation 19 uses known interferometry techniques to compute the attitude of the platform. The computation is based on the range differences between the different antenna elements (11A, 11B, and 11C) for each of the incoming signals being tracked, the known geometric configuration of the antenna elements (11A, 11B, and 11C) relative to each other in the platform frame of reference, the known or ascertainable carrier frequencies of the incoming signals, and the known or ascertainable directions between the platform location and the sources of the incoming signals in a fixed frame of reference. In some embodiments, the platform's location and the directions between the platform lcoation and the sources of the incoming signals will be derived by the receiver from those incoming signals. In the example of FIG. 1, microprocessor 20 also can provide a navigation solution based on information derived from the incoming signals being tracked in channels 17a through 17n.

Generally, the accuracy of the attitude computation is greater as the distances between the antenna elements (11A, 11B, and 11C) increase. Accuracies of at least one to ten milliradians are attainable with one to two meter antenna spacing. Some testing has achieved an accuracy of 0.3 milliradians with a one meter baseline in a controlled environment. However, when the antenna spacing (projected in the direction of an incoming signal) exceeds the wavelength of that incoming signal, the range difference becomes ambiguous because a single delta range measurement can reflect different solutions (e.g., a measurement of a quarter cycle could reflect an actual difference of ¼ cycle, 1¾ cycles, 2¼ cycles, etc.).

This ambiguity may be resolved by measuring the delta range for a number of different incoming signals. The number of receiver channels required increases rapidly, though, if a separate channel is used for each antenna element for each incoming signal. Therefore, an advantage of the multiplexing of the present invention is that only a third as many receiver channels are required (for three antenna elements) for the same number of incoming signals being tracked. For example, four channels (17a through 17d) might be used in an embodiment of FIG. 1 to track four different incoming signals. Without multiplexing, twelve channels would be required with three antenna elements for the same four incoming signals.

As mentioned above, the attitude calculation is based on range differences between the different antenna elements (11A, 11B, and 11C) for each of the incoming signals being tracked. The desired range difference may be represented as $$\beta_i^j = L_i \cdot LOS^j / \lambda^j,$$

for i denoting antenna element pairs (11A to 11B, 11B to 11C, and 11C to 11A in the example of FIG. 1, and simplified to AB, BC, and CA in discussing the example graph of FIG. 2) and for j denoting incoming signals being tracked (a, b, . . . , n), where $L_i$ is the relative position vector between antenna element pair i, $LOS^j$ is the unit vector between the platform and the source of incoming signal j, and $\lambda^j$ is the carrier wavelength of incoming signal j.

An $LOS^j$ may be slightly different from one antenna element to another, but that difference is of no practical significance as the distance between antenna elements is negligible compared to the distance between the platform and the source of an incoming signal. $LOS^j$ and $\lambda^j$ are known or can be ascertained. $L_i$ is also known, but $L_i$ is known in the platform frame of reference, and $LOS^j$ can be ascertained in a fixed frame of reference. Determining the desired range differences $\beta_i^j$ will permit derivation of the relationship between the two frames of reference, i.e., the attitude of the platform.

Figure 2:
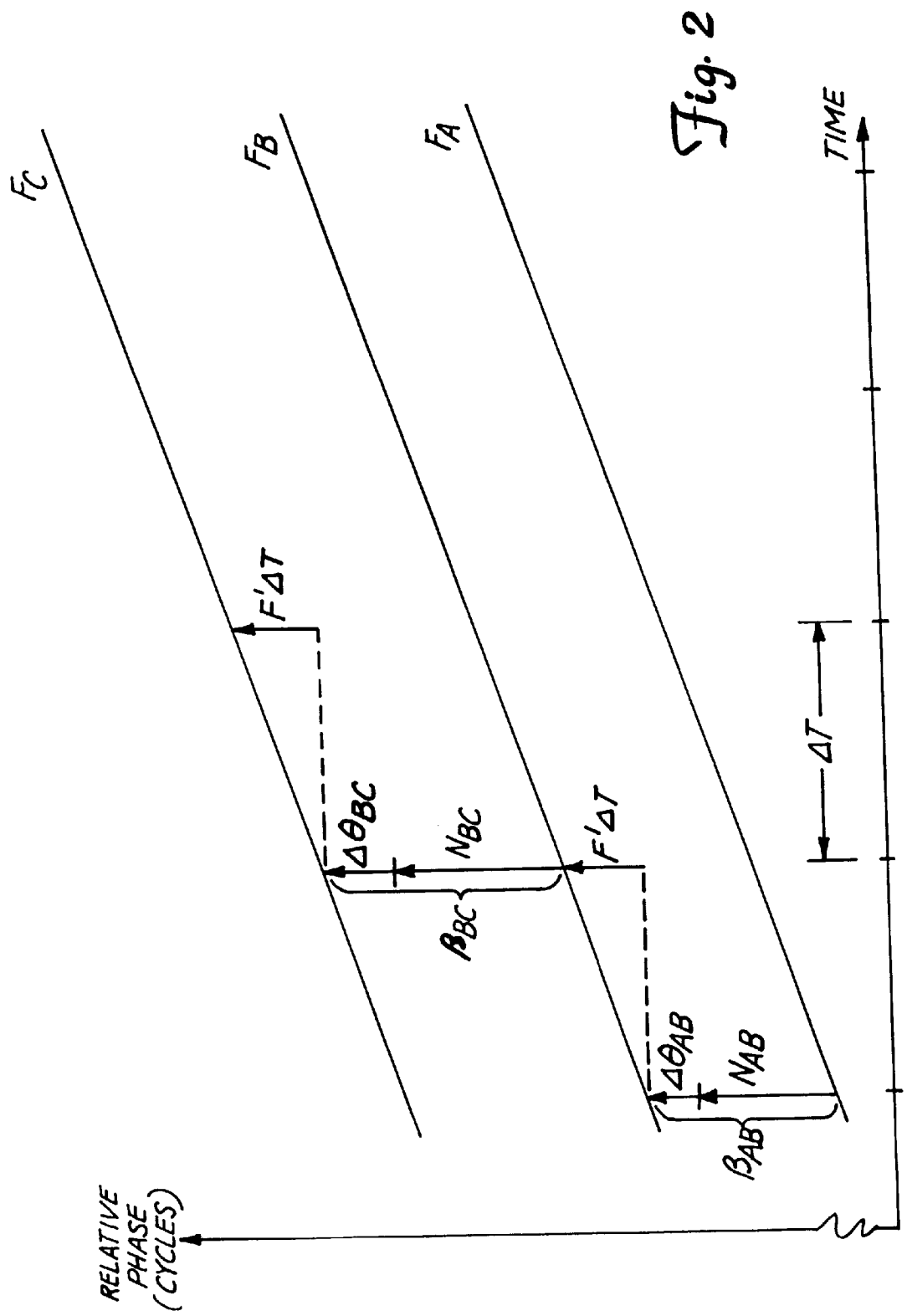
FIG. 2 is an example graph of relative phase over time at three antenna elements for a single incoming signal.

FIG. 2 is an example graph of the measured relative phase over time for a single incoming signal. (Therefore, the j superscript will not always be used in discussing FIG. 2.) Lines $F_A$, $F_B$, and $F_C$ can represent the phase at each of three antenna elements, respectively, for that single incoming signal. The desired $\beta_{AB}$, $\beta_{BC}$, or $\beta_{CA}$ can be represented as the vertical differences between respective lines $F_A$, $F_B$, and $F_C$ at any point in time. The desired $\beta_i^j$ can contain an integer part $N_i^j$ and a fractional part $\Delta\theta_i^j$, depending on how many wavelengths $\lambda^j$ there are on the projection of $L_i$ on $LOS^j$. That is, $$\beta_i^j = L_i \cdot LOS^j / \lambda^j = N_i^j + \Delta\theta_i^j.$$

The vertical change in any one of lines $F_A$, $F_B$, or $F_C$ during the sampling interval $\Delta T$, i.e., between two specific time values on the horizontal axis, can represent the changes in the phase at one antenna element during that sampling interval. In the FIG. 2 example, that vertical change is represented generally as $F'\Delta T$ for each time interval $\Delta T$, where F' represents the slope of lines $F_A$, $F_B$, or $F_C$. F' may vary over time. F' also may vary slightly between lines $F_A$, $F_B$, and $F_C$ (i.e., at any given time, the rate at which the phase of one incoming signal is changing at one antenna element may vary slightly from the rate at which it is changing at a second antenna element). In practice, however, that variation between antenna elements may be sufficiently small that it is unimportant.

$F'\Delta T$ results from the various effects on the phase of the carrier (for incoming signal j) at any one antenna element. Those effects can include receiver clock induced effects, range rate effects due to movement of the platform (compensated by inertial system augmentation if present), range rate effects due to motion of the source of incoming signal, source clock induced effects, and SA errors.

The sequential determination of the delta range for an incoming signal j during a sampling interval $\Delta T$ (i.e., the integration over the sampling interval of all of the control commands from the channel tracking incoming signal j) does not correspond with $F'\Delta T$ because of the periodic switching among the different antenna signals. The delta range for an incoming signal j includes $F'\Delta T$, but also includes effects due to the switching. By synchronizing the delta range sampling with the multiplexing 14, the delta range $\Delta\Phi_i^j$ associated with a particular antenna pair i may be used to observe $\Delta\theta_i^j$ (the fractional part of a wavelength in the range difference between antenna pair i for incoming signal j). In the embodiment of FIG. 1, the multiplexing 14 would not be at a rate greater than the rate of the delta range sampling.

A delta range $\Delta\Phi_i^j$ is accumulated for incoming signal j, over a sampling time interval (or possibly a series of sampling intervals) during which switching occurred between two antenna signals of antenna pair i. $\Delta\Phi_i^j$ will include $F'\Delta T$ (the changes in the phase at any single antenna element); it will include a term $\delta_i$ representing the phase change due to differences of antenna cable lengths between the two antenna elements of antenna pair i; and it will include $\Delta\theta_i^j$ (the fractional part of the desired range difference $\beta_i^j$). However, $\Delta\Phi_i^j$ will not reflect $N_i^j$ (the integer part of the desired range difference $\beta_i^j$), because phase changes of integer cycles will not be detected in the carrier tracking loop when they result from step changes in the signal applied to the loop.

A delta range $\Delta\Phi_i^j$ can be adjusted for the SA effects (if known), known or estimated effects for source motion, modeled source clock drift, and effects of platform motion (if inertial system augmentation is present in a dynamic state). This adjusted delta range still includes $\Delta\theta_i^j$ (the fractional part of the desired range difference $\beta_i^j$), $\delta_i$ (the cabling bias difference between the two antenna elements of antenna pair i), and a term $\epsilon\Delta T$ representing the effect of receiver clock error over the delta range sampling interval.

In one embodiment, a difference $\gamma_i^k$ can be developed between the adjusted delta ranges observed for two different incoming signals, for k denoting pairs of signals being tracked (e.g., a and b, a and c, etc.). This observed difference $\gamma_i^k$ can eliminate the effects due to the antenna cabling bias $\delta_i$ and the receiver clock error $\epsilon\Delta T$. For example, $$\begin{aligned}\gamma_i^{ab} &= (\Delta\theta_i^a + \delta_i + \epsilon\Delta T) - (\Delta\theta_i^b + \delta_i + \epsilon\Delta T) \\ &= \Delta\theta_i^a - \Delta\theta_i^b \\ &= (\beta_i^a - N_i^a) - (\beta_i^b - N_i^b) \\ &= \beta_i^a - \beta_i^b - N_i^{ab},\end{aligned}$$

where $N_i^{ab} = N_i^a - N_i^b$, an integer ambiguity for the observed difference $\gamma_i^{ab}$. The antenna cabling bias $\delta_i$ and the receiver clock error $\epsilon\Delta T$ have been removed.

Substituting the dot product mentioned above for the range difference $\beta_i^j$ shows the relationship between the observed difference $\gamma_i^k$ and the $L_i$ and $LOS^j$ vectors.

$$\begin{aligned}\gamma_i^{ab} &= (L_i \cdot LOS^a / \lambda^a) - (L_i \cdot LOS^b / \lambda^b) - N_i^{ab} \\ &= L_i \cdot \{(LOS^a / \lambda^a) - (LOS^b / \lambda^b)\} - N_i^{ab}.\end{aligned}$$

For example, if incoming signals a and b have the same carrier frequency, the observed difference $\gamma_i^{ab}$ is related as indicated to $L_i$ (the relative postition vector between antenna element pair i) projected onto the vector difference between unit LOS vectors (which point between the platform location and the sources for incoming signals a and b).

In one embodiment, other observed differences also can be developed, such as $\gamma_i^{ac}$ and $\gamma_i^{ad}$ for respective signal pairs a and c, and a and d. The resultant set of differences $\gamma_i^k$ can be processed to resolve the integer ambiguity and determine attitude using known techniques. Advantage may be taken of either the platform being stationary or its motion being measured by an intertial system and compensated. The $\Delta\theta_i^j$ vary slowly and are very repeatable.

Various techniques are known to resolve the integer cycle ambiguity. As mentioned above, $L_i$ is known in the platform frame of reference, and $LOS^j$ can be ascertained in a fixed frame of reference. The objective is to determine the attitude of the platform; i.e., the relationship between those two frames of reference. In some embodiments, known integer cycle ambiguity routines can select candidate platform attitude angles (roll, pitch, and heading), and calculate the dot product mentioned above. Different candidate attitude angles are tried until the calculation results are within measurement error tolerances of the observed differences $\gamma_i^k$, and the attitude solution is validated. After performing an initial resolution of the integer cycle ambiguity, the associated attitude solution can be further refined by filtering the data with any of several known techniques including a least mean square error curve fit, a fixed impulse response filter, and a Kalman filter.

In some navigation systems available at present, each source transmits two signals with different carrier frequencies. The known dual frequency tracking and "wide laning" techniques, sometimes used in conjunction with those navigation systems, also can be used with some embodiments of the present invention. These techniques typically can use the frequency difference between two incoming signals from the same source to achieve significant simplification of the attitude solution.

In general, different known strategies can be used for assigning incoming signals to the available receiver channels. Such assignments and re-assignments over time can be implemented by known techniques, such as software controls, with necessary control signals generated in microprocessor 20 in an embodiment of FIG. 1.

Some advantages of the present invention include the fewer number of channels required to determine attitude, the need for only a single difference computation (to eliminate cable biases and receiver clock errors), the lower noise due to the slow rate of multiplexing, the simplification of measurement synchronization and the use of a single frequency reference (and resulting cancellation of receiver clock errors) since only one receiver is needed.

The embodiments discussed and/or shown in the figures are are examples of circuits and methods for determining the attitude of a platform with sequencing antenna inputs. These examples are not exclusive ways to practice the present invention, and it should be understood that there is no intent to limit the invention by such disclosure. Rather, it is intended to cover all modifications and alternative constructions and embodiments that fall within the spirit and the scope of the invention as defined in the following claims.

What is claimed is:

1. An attitude determination system for determining attitude of a platform, the system comprising:

a plurality of antenna elements, each of the antenna elements being configured to receive a plurality of incoming signals;

a multiplexer which time-multiplexes among antenna signals received respectively by each of the antenna elements;

a plurality of channels to which a received signal is applied, the received signal coupled from an output of the multiplexer, each of the channels capable of tracking at least one of the incoming signals respectively;

a phase difference processor which determines phase differences between at least some of the antenna elements, for at least one of the incoming signals being tracked; and an attitude calculator which computes attitude of the platform based on the phase differences.

2. An attitude determination system as set forth in claim 1, further comprising a signal conditioner which converts carrier frequencies of the time-multiplexed antenna signals from transmission frequencies to intermediate frequencies.

3. An attitude determination system as set forth in claim 1, wherein at least one of the channels synchronizes a locally generated code with an incoming code which modulates the incoming signal being tracked in said at least one channel.

4. An attitude determination system as set forth in claim 1, wherein the channels generate control commands in tracking the incoming signals, and the phase difference processor integrates the control commands over a sampling time interval.

5. An attitude determination system as set forth in claim 1, wherein the phase difference processor cancels system biases by subtracting measurements related to phase differences between a single pair of the antenna elements for different incoming signals.

6. An attitude determination system as set forth in claim 1, wherein computing of the attitude of the platform is based further on platform navigation information derived from signals available from the channels.

7. An attitude determination system for determining attitude of a platform, the system comprising:

means for receiving et plurality of incoming signals, said receiving means having a plurality of elements;

means for time-multiplexing among antenna signals received respectively by each of the elements of the receiving means;

means for applying a received signal to a plurality of channels, the received signal coupled from an output of the multiplexing means;

means for tracking at least one of the incoming signals in each of the channels respectively;

means for determining phase differences between at least some of the elements of the receiving means, for at least one of the incoming signals being tracked; and means for computing attitude of the platform based on the phase differences.

8. An attitude determination system as set forth in claim 7, wherein the tracking means generates control commands in tracking the incoming signals, and the determining means integrates the control commands over a sampling time interval.

9. A method for determining attitude of a platform, the method comprising the steps of:

receiving a plurality of incoming signals by a plurality of antenna elements;

time-multiplexing among antenna signals received respectively by each of the antenna elements;

applying a received signal to a plurality of channels, the received signal coupled from an output produced by the multiplexing step;

tracking at least one of the incoming signals in each of the channels respectively;

determining phase differences between at least some of the antenna elements, for at least one of the incoming signals being tracked; and computing attitude of the platform based on the phase differences.

10. A method for determining attitude of a platform as set forth in claim 9, further comprising the step of converting carrier frequencies of the time-multiplexed antenna signals from transmission frequencies to intermediate frequencies.

11. A method for determining attitude of a platform as set forth in claim 9, wherein the time-multiplexing step occurs at a rate no greater than approximately 10 Hertz.

12. A method for determining attitude of a platform as set forth in claim 9, wherein the time-multiplexing step occurs at a rate no greater than approximately 1 Hertz.

13. A method for determining attitude of a platform as set forth in claim 9, wherein, in at least one of the channels, the tracking step includes synchronizing a locally generated code with an incoming code which modulates the incoming signal being tracked in said at least one channel.

14. A method for determining attitude of a platform as set forth in claim 9, wherein the tracking step includes generating control commands in tracking the incoming signals, and the determining step includes integrating the control commands over a sampling time interval.

15. A method for determining attitude of a platform as set forth in claim 14, wherein a sampling rate for integrating the control commands is synchronized with a multiplexing rate in the multiplexing step, the multiplexing rate being no greater than the sampling rate.

16. A method for determining attitude of a platform as set forth in claim 9, wherein the determining step is accomplished using digital processing.

17. A method for determining attitude of a platform as set forth in claim 9, wherein the determining step cancels system biases by subtracting measurements related to phase differences between a single pair of the antenna elements for different incoming signals.

18. A method for determining attitude of a platform as set forth in claim 9, wherein the computing step is based further on platform navigation information derived from signals available from the tracking step.

19. A method for determining phase differences for an incoming signal between a plurality of antenna elements, the method comprising the steps of:

time-multiplexing among antenna signals received respectively by each of the antenna elements, each of the antenna signals including the incoming signal;

using a loop phase error signal to track the incoming signal included in a received signal, the received signal coupled from an output produced by the multiplexing step; and integrating a control command over a sampling time interval, the control command derived from the error signal, a sampling rate in said integrating step being synchronized with a multiplexing rate in the multiplexing step, the multiplexing rate being no greater than the sampling rate.

20. A system for determining phase differences for an incoming signal between a plurality of antenna elements, the system comprising:

a multiplexer which time-multiplexes among antenna signals received respectively by each of the antenna elements, each of the antenna signals including the incoming signal;

a channel which uses a loop phase error signal to track the incoming signal included in a received signal, the received signal coupled from an output of the multiplexer; and a processor which integrates a control command over a sampling time interval, the control command derived from the error signal, a sampling rate of the processor being synchronized with a multiplexing rate of the multiplexer means, the multiplexing rate being no greater than the sampling rate.

* * * * *